US011570342B2

(12) United States Patent
Akkaya et al.

(10) Patent No.: US 11,570,342 B2
(45) Date of Patent: Jan. 31, 2023

(54) SELECTIVE POWER EFFICIENT THREE-DIMENSIONAL IMAGING

(71) Applicant: Microsoft Technology Licensing, LLC, Redmond, WA (US)

(72) Inventors: Onur Can Akkaya, Palo Alto, CA (US); Cyrus Soli Bamji, Fremont, CA (US); Arrigo Benedetti, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 16/793,851

(22) Filed: Feb. 18, 2020

(65) Prior Publication Data

US 2021/0258457 A1    Aug. 19, 2021

(51) Int. Cl.
 *H04N 5/225* (2006.01)
 *H04N 5/235* (2006.01)
 *G06T 7/11* (2017.01)
 *H04N 13/254* (2018.01)
 *H04N 13/271* (2018.01)

(52) U.S. Cl.
 CPC ............. *H04N 5/2256* (2013.01); *G06T 7/11* (2017.01); *H04N 5/2354* (2013.01); *H04N 13/254* (2018.05); *H04N 13/271* (2018.05)

(58) Field of Classification Search
 CPC .. H04N 5/2256; H04N 5/2354; H04N 13/254; H04N 13/271; G06T 7/11; G01S 7/4911; G01S 17/894
 See application file for complete search history.

(56) References Cited

U.S. PATENT DOCUMENTS

| 10,412,280 | B2 | 9/2019 | Akkaya et al. |
| 10,430,958 | B2 | 10/2019 | Akkaya et al. |
| 11,236,993 | B1 * | 2/2022 | Hall ...................... G01S 7/4865 |
| 2011/0102763 | A1 | 5/2011 | Brown et al. |
| 2012/0306681 | A1 | 12/2012 | Elad et al. |
| 2016/0054434 | A1 | 2/2016 | Williams et al. |
| 2018/0146186 | A1 | 5/2018 | Akkaya et al. |

(Continued)

FOREIGN PATENT DOCUMENTS

EP    3531688 A2    8/2019

OTHER PUBLICATIONS

"International Search Report and Written Opinion Issued in PCT Application No. PCT/US21/015978", dated May 14, 2021, 15 Pages.

*Primary Examiner* — Padma Haliyur
(74) *Attorney, Agent, or Firm* — Alleman Hall Creasman & Tuttle LLP

(57) ABSTRACT

An imaging method includes acquiring one or more passive light images of a scene. A region of interest in the scene is identified based on the one or more passive light images. One or more illumination zones of a plurality of illumination zones that collectively cover the region of interest is determined. Each illumination zone is sized according to active illumination emitted from a steerable illumination source. For a determined illumination zone of the one or more illumination zones, the illumination zone is individually illuminated with the active illumination from the steerable illumination source. For a pixel of a sensor array that maps to the illumination zone, a depth value of an object locus in the scene reflecting the active illumination back to the pixel is determined.

20 Claims, 10 Drawing Sheets

(56) References Cited

U.S. PATENT DOCUMENTS

| | | |
|---|---|---|
| 2019/0154809 A1 | 5/2019 | Akkaya et al. |
| 2019/0254143 A1* | 8/2019 | Hallack .................. A61L 2/084 |
| 2019/0306386 A1 | 10/2019 | Akkaya et al. |
| 2019/0366552 A1* | 12/2019 | Simkins ................ G06V 20/64 |
| 2020/0041620 A1 | 2/2020 | Onal et al. |

* cited by examiner

SELECTIVE POWER EFFICIENT THREE-DIMENSIONAL IMAGING

BACKGROUND

A two-dimensional (2D) camera can include a monochrome or color image sensor that can acquire images in an infrared (IR), near infrared (NIR), visible (i.e., color), and/or ultraviolet (UV) portion of the electromagnetic spectrum. A color 2D camera typically relies on ambient illumination of a scene to acquire 2D passive light images. In addition, computations to process and analyze data from a 2D camera can be relatively minimal. Such factors can make a 2D camera relatively power efficient.

A three-dimensional (3D) camera typically operates by actively illuminating a scene and determining a depth of an object in the scene reflecting the active illumination back to the 3D camera by measuring one or more parameters of the active illumination. Such active illumination is often constrained to IR or NIR illumination so that it will not be perceivable to a human observer. The generation of the active illumination and computations to process and analyze data from a 3D camera can be relatively resource intensive. Such active illumination and resource intensive processing, among other factors, can make a 3D camera relatively less power efficient than a 2D camera.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An imaging method includes acquiring one or more passive light images of a scene. A region of interest in the scene is identified based on the one or more passive light images. One or more illumination zones of a plurality of illumination zones that collectively cover the region of interest is determined. Each illumination zone is sized according to active illumination emitted from a steerable illumination source. For a determined illumination zone of the one or more illumination zones, the illumination zone is individually illuminated with the active illumination from the steerable illumination source. For a pixel of a sensor array that maps to the illumination zone, a depth value of an object locus in the scene reflecting the active illumination back to the pixel is determined.

DETAILED DESCRIPTION

This disclosure is directed to an imaging system that combines the ambient-resilient and long-range depth imaging capability of a zoned three-dimensional (3D) depth camera and the power efficiency of a two-dimensional (2D) camera to provide a power efficient hybrid 2D/3D imaging system.

Figure 1:
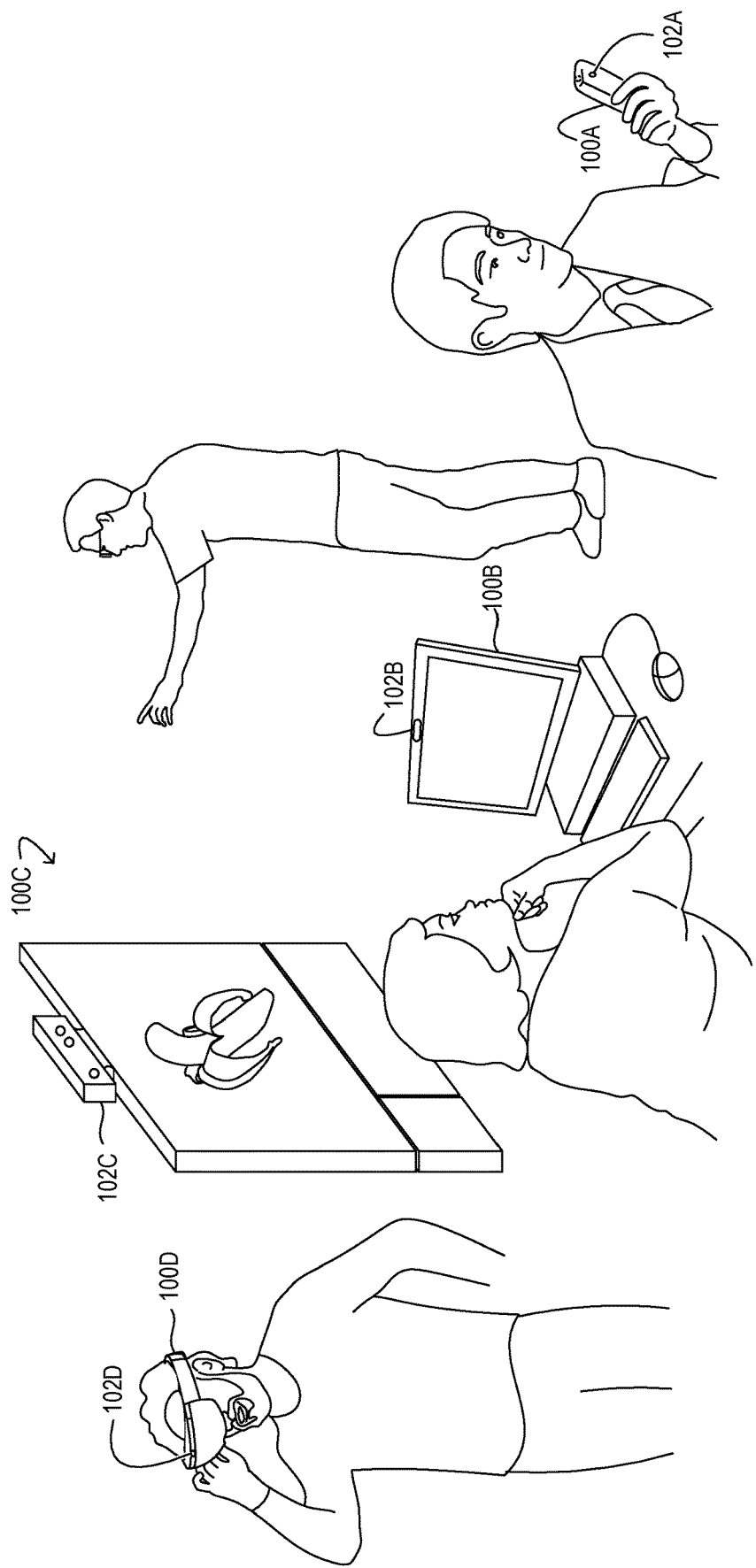
FIG. 1 shows example electronic devices having embedded or peripheral imaging systems.

FIG. 1 shows aspects of four exemplary electronic devices (100A-D) including such imaging systems (102A-D) either embedded or peripheral to the electronic device. Device 100A is a smartphone that includes an imaging system 102A. Device 100B is a personal computer that includes an imaging system 102B in the form of a "web camera". Device 100C is a video game system that includes a peripheral imaging system 102C. Device 100D is a virtual-reality or augmented-reality headset that includes an imaging system 102D. The example power efficient 2D/3D imaging approaches disclosed herein may be applicable to these and other imaging systems.

Figure 2A:
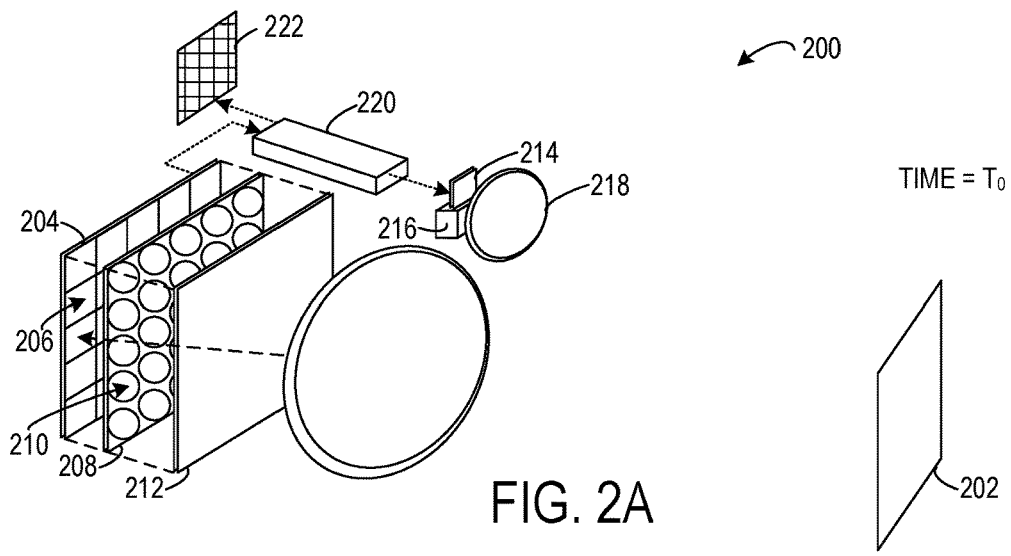
FIGS. 2A-2C schematically show an example imaging system.
Figure 2B:
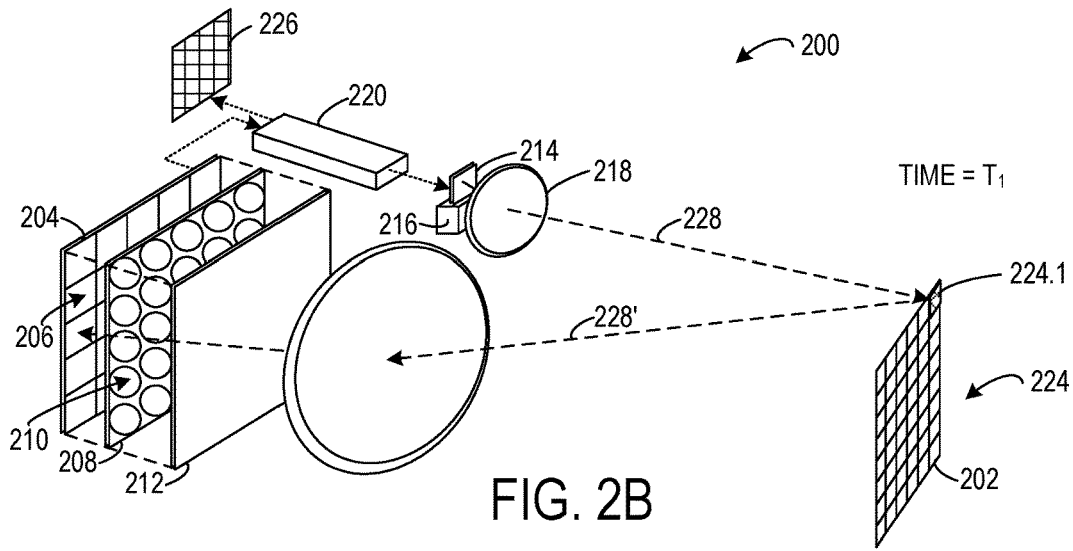
Figure 2C:
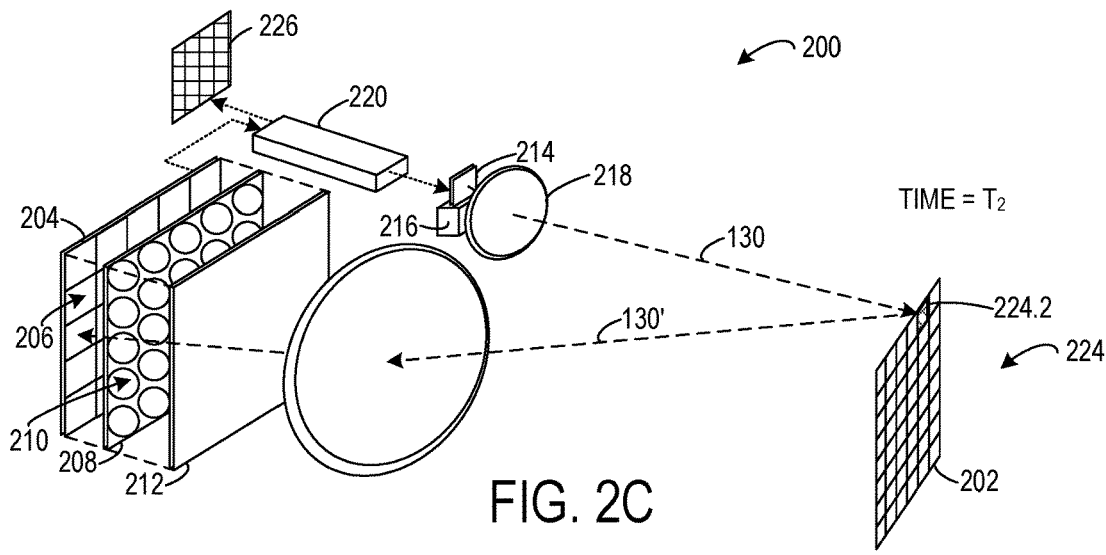

FIGS. 2A-2C show aspects of an example imaging system 200. The imaging system 200 also may be referred to herein as a camera. The term 'camera' refers herein to any imaging component having at least one optical aperture and sensor array configured to image a scene or subject 202. The imaging system 200 includes a sensor array 204 of individually addressable pixels 206. In some implementations, the pixels may be complementary metal-oxide semiconductor (CMOS) elements, but other suitable architectures are envisaged as well. Each pixel is responsive to light over a broad wavelength band. For silicon-based (e.g. CMOS) pixels, the wavelength response may range from 300 to 1000 nm, for example. The sensor array 204 is schematically illustrated with only twenty-five pixels 206 for simplicity, although there is no theoretical limitation to the number of pixels 206.

In some implementations, the pixels 206 of sensor array 204 may be differential pixels. Each differential pixel may include different collection terminals that are energized according to two different clock signals. In one example, to measure modulated active illumination, the two clock signals may be substantially complementary (e.g., the two clock signals have 50% duty cycles that are 180 degrees out of phase). In other examples, the two different clock signals may have a different relationship, such as for measuring ambient illumination or non-modulated active illumination. When the different terminals are activated based on the corresponding clock signal, electric fields are created that attract and collect photoelectric charges in the different terminals.

Such operation allows for the same sensor array to be used to measure active light across a broad spectrum including ultraviolet, visible, NIR, and IR light. Further, the differential pixels may reduce system noise, because only one read operation is required to perform a differential measurement of active spectral light and ambient light (i.e., a difference of a measurement of active light and ambient light and a measurement of ambient light without active light). In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be written to memory.

In other camera implementations that do not include sensor arrays of differential pixels, additional clock cycles may be required to perform a differential measurement. While differential pixels provide the advantages described herein, it will be appreciated that other types of sensor array, including non-differential sensor arrays, may be used.

Microlens array 208 optionally may be arranged directly over sensor array 204. Microlens array 208 includes a plurality of microlens elements 210. Each microlens element 210 of microlens array 208 may be registered to a differential pixel 206 of the sensor array 204. When included, microlens array 208 may provide a larger effective fill factor at each of the pixels, for increased collection efficiency and reduced crosstalk between pixels.

Optical shutter 212 optionally may be arranged over sensor array 204, so as to optically cover the sensor array. When included, the optical shutter 212 is electronically switchable between different light-filtering states. In one example, the optical shutter 212 may include two or more light filtering states. In one filtering state, the optical shutter 212 may transmit IR light and block light outside of the IR band (e.g., visible light). In another filtering state, the optical shutter 212 may transmit visible light and block light outside of the visible light sub-band (e.g., IR light). The optical shutter 212 may be configured to transmit light in any suitable selected sub-band of the electromagnetic spectrum and block light outside of the selected sub-band. The optical shutter 212 may increase a signal-to-noise ratio of IR images and visible light images acquired by the sensor array 204. The optical shutter 212 may include any suitable type of filter that transmits a narrow-band of light without significantly reducing the intensity of the in-band signal received by the sensor array. In one example, the optical shutter may include one or more liquid crystal layers.

In some implementations, the optical shutter may be omitted from the imaging system 200. For example, the optical shutter may be omitted in order to reduce a cost and/or complexity of an imaging optical stack. In some cases, omitting the optical shutter may allow the imaging optical stack to advantageously have a smaller total optical track length (TTL), because an imaging lens can be designed without the added complexity of having a tunable filter in the imaging optical stack.

A steerable illumination source 214 may be configured to selectively emit active illumination to illuminate the scene 202. The steerable illumination source 214 may emit any suitable active illumination. In some implementations, the steerable illumination source 214 may be modulated. In other implementations, the steerable illumination source 214 may be un-modulated. In some examples, the steerable illumination source 214 may include a solid-state laser or a LED operating in the near-infrared or infrared (IR) range (~850 nm) to emit active IR light.

In other implementations, the steerable illumination source 214 may be configured to emit active illumination light in a visible spectral band. In some examples, the steerable illumination source 214 may include a broad-band illumination source, such as a white light source. In some examples, the steerable illumination source 214 may include a plurality of spectral illuminators (e.g. LEDs). In some such examples, the plurality of spectral illuminators may be configured to emit active illumination in the same spectral band, although this is not required.

In some examples, the steerable illumination source 214 may be configured to selectively emit active illumination light having a narrow field that is sized to illuminate an active illumination zone in the scene 202. Further, the steerable illumination source 214 comprises a steering element 216 configured to steer the active illumination light emitted from the steerable illumination source 214 to individually actively illuminate different illumination zones of a plurality of illumination zones 224 (shown in FIGS. 2B and 2C) in the scene 202 viewed by the sensor array 204. Such a zoned arrangement produces an active illumination light having a smaller angular extent than the field of view of the sensor array 204, and thereby may provide a greater power density for the same peak power of the active illumination relative to full-field imaging. An illumination zone may be configured to be any suitable size that is less than an entire field of view of the scene viewed by the sensor array 204. In some examples, the size of each illumination zone may be based on characteristics of the steerable illumination source 214. Nonlimiting examples of such characteristics include size, power consumption, frequency, angle, positional repeatability, and drive voltage requirements of the steerable illumination source 214.

In some implementations, a calibration procedure may be performed on the imaging system 200 to determine a plurality of illumination zones. The calibration procedure may further include determining pixels 206 of the sensor array 204 that spatially map to each illumination zone. In some examples, the determined illumination zones may collectively cover the entire field of view of the scene 202 viewed by the sensor array 204. In some examples, different illumination zones may overlap each other. Any suitable number of illumination zones may be determined to collectively cover the field of view of the sensor array 204. Further, any suitable number of pixels of the sensor array may be mapped to each illumination zone.

The steering element 216 may include any suitable mechanical, electro optical, micro-electro-mechanical-systems (MEMS), electrowetting prism componentry, and/or other steering componentry configured to suitably steer the active illumination emitted from the steerable illumination source 216 to illuminate a designated illumination zone. In some examples, the steering element 216 may comprise a movable mirror, providing for a mechanical steering component to steer the active illumination light to illuminate an illumination zone in the scene 202. In some examples, the steering element 216 may comprise one or more mirrors. In one example, at least one of a plurality of mirrors comprises a movable mirror (e.g., a micromirror). In some examples, the steering element 216 may comprises a refracting lens (e.g., Fresnel, prismatic, etc.) with a non-uniform surface that directs, or steers, light in differing directions based on the input light's lateral position. In some examples, the steering element 216 may comprise a switchable polarization grating, providing for an electro-optical steering component. In some examples, the steering element 216 may comprise a liquid crystal lens system (for example a pair of liquid crystal lenses), providing for steering by an electrowetting steering solution (an electrowetting component). In some examples, the liquid crystal lenses may be arrays of microlenses suspended in a liquid crystal that can be adjusted electrically to steer light.

In some implementations, the steerable illumination source 214 optionally may include one or more optical elements 218. For example, the optical element(s) 218 may include one or more of a collimating element, diffusing element, and a focusing element. The collimating element may be operative to collimate light emitted from the steerable illumination source 214 into collimated light. The diffusing element may be operative to diffuse light emitted from the steerable illumination source 214, thereby converting the collimated light into diffused light having a desired profile (e.g., uniform or Gaussian power profile). The focusing element may be operative to focus the diffused light at a designated focal length. Such a designated focal length may be selected based on application or any other suitable factors. In some implementations, any or all of these optical elements may be omitted from the steerable illumination source 214.

A controller 220 may include a logic machine and associated storage machine. The storage machine may hold instructions that are executable by the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded.

The controller 220 may be configured to individually control the pixels 206 of the sensor array 204 and the steerable illumination source 214 to selectively acquire different types of images (e.g., 2D, 3D) of at least a portion of the scene 202 viewed by the sensor array 204. The controller 220 may be configured to control the sensor array 204 to acquire a full-field 2D image. In the illustrated example shown in FIG. 1A, at time $T_0$, the controller 220 may be configured to address all of the pixels 206 of sensor array 204 while the steerable illumination source 214 is deactivated to acquire a 2D passive light image (e.g., monochrome or color image) of the scene 202. As used herein, time $T_0$ is considered to include the full duration from the beginning of time $T_0$ until time $T_1$, and thus allows for sequentially addressing the individual pixels in the $T_0$ timeframe. The same convention is used for other times discussed herein. As used herein, the term 'deactivated' means the steerable illumination source 214 does not emit active illumination light to illuminate the scene 202. When the steerable illumination source 214 is deactivated, the steerable illumination source 214 may consume minimal or no power. Instead, in this case, the sensor array 204 relies on the ambient illumination of the scene 202 to acquire the 2D passive light image 222. In implementations where the optical shutter 212 is included, the controller 220 may be configured to switch the optical shutter 212 to allow light in the visible spectrum to pass through to the sensor array 204.

The controller 220 may be configured to control the sensor array 204 and the steerable illumination source 214 to acquire image data based on active illumination for individual illumination zones of the scene 202. The controller 220 may use such image data based on active illumination to determine depth values of objects located in the illumination zone as described in further detail below. In the illustrated example shown in FIG. 1B, at time $T_1$, the steerable illumination source 214 is configured to emit active IR illumination light. The controller 220 may be configured to control (i.e., activate and steer) the steerable illumination source 214 to illuminate a first illumination zone 224.1 with active IR illumination light 228. The controller 220 may be configured to address the pixels 206 of sensor array 204 that are mapped to the first illumination zone 224.1 to acquire IR image data for the first illumination zone. In particular, active IR illumination light 228' reflected from an object locus in the scene 202 that is incident on each sensor that is mapped to the first illumination zone 224.1 is measured for IR image acquisition. Note that the controller 220 may not address or "read out" the pixels 206 of the sensor array 204 that are not mapped to the first illumination zone 224.1 at time $T_1$ in order to increase power efficiency of the imaging system 200. When optical shutter 212 is included, the controller 220 may be configured to switch the optical shutter 212 to block light outside of the IR (or near IR) light sub-band in synchronicity with activation of the steerable illumination source 214 for IR image acquisition of the first illumination zone 224.1.

Further, as shown in FIG. 1C, at time $T_2$, the controller 220 may be configured to control (i.e., activate and steer) the steerable illumination source 214 to illuminate a second illumination zone 224.2 with active IR illumination light 230. The controller 220 may be configured to address the pixels 206 of sensor array 204 that are mapped to the second illumination zone 224.2 to acquire IR image data for the second illumination zone. In particular, active IR illumination light 230' reflected from an object locus in the scene 202 that is incident on each pixel that is mapped to the second illumination zone 224.2 is measured for IR image acquisition. Note that the controller 220 may not address or "read out" the pixels 206 of the sensor array 204 that are not mapped to the second illumination zone 224.2 at time $T_2$ in order to increase power efficiency of the imaging system 200. When optical shutter 212 is included, the controller 220 may be configured to switch the optical shutter 212 to block light outside of the IR (or near IR) light sub-band in synchronicity with activation of the steerable illumination source 214 for IR image acquisition of the second illumination zone 224.2.

The controller 220 may be configured to repeat the above described imaging operations to acquire image data based on active illumination for any suitable number of different illumination zones. For example, such image data may be acquired for 3D imaging of the different illumination zones. In some examples, the entire field of view of the scene viewed by the sensor array 204 may be imaged by sequentially individually imaging a plurality of illumination zones that cover the field of view. In some examples, only an identified region of interest covered by one or more illumination zones may be imaged by individually imaging the illumination zone(s) that cover the identified region of interest.

The term 'address' as applied to pixels 206 of sensor array 204 may have a somewhat different meaning depending on the imaging mode described. For 2D imaging, addressing the pixels 206 may include integrating the intensity of ambient light received at each pixel 206 and associating the integrated intensity of the ambient light in the sub-band with the portion of the 2D image corresponding to that pixel.

For 3D imaging, the pixels 206 may be addressed differently. Here, addressing the pixels may include resolving a phase offset from each pixel relative to the modulated intensity of the IR light. The phase offset, optionally converted into the depth domain, may be associated with the portion of the image corresponding to the pixel addressed. In other words, the controller 220 may be configured to determine a depth value for each pixel 206 of the sensor array 204 that is addressed. In some implementations, a series of IR image acquisitions (e.g., 6-9) in rapid succession may be used to obtain the phase offset. In combination 2D/3D imaging applications, both of the above addressing modes may be used in a time multiplexed manner.

The phase-discriminating time-of-flight (ToF) approach described above is one of several depth-imaging technologies encompassed by this disclosure. In general, a depth-imaging camera may be configured to acquire one or more depth maps of a scene or subject. The term 'depth map' refers to an array of pixels registered to corresponding regions ($X_i$, $Y_i$) of an imaged scene, with a depth value ($Z_i$) indicating, for each pixel, the depth of the corresponding region. In some examples, 'Depth' may be defined as a coordinate parallel to the optical axis of the camera, which increases with increasing distance from the camera. In other examples, depth may be defined as a radial distance from the camera. The term 'depth video' refers herein to a time-resolved sequence of depth maps. In ToF implementations, the IR illumination source (e.g., the steerable illumination source 214) may project pulsed or otherwise modulated IR illumination towards the scene. The sensor array of the depth-imaging camera may be configured to detect the phase offset between the illumination reflected back from the scene and the modulated emission. In some implementations, the phase offset of each pixel may be converted into a pixel-resolved time of flight of the pulsed illumination, from the illumination source to the scene and then back to the array. ToF data may then be converted into depth data.

The controller 220 may be configured to output 2D image data and 3D image data (or depth data) in any suitable form. As one example, the controller 220 may be configured to output a matrix of pixels 226. Each pixel in the matrix includes a depth value (L) and one or more visible light values (e.g., monochrome or color values). In some examples, the controller 220 may output the matrix of pixels 226 as a data structure in which each element of the matrix corresponds to a different pixel, and each element of the matrix includes an array of values corresponding to the depth value and the one or more visible light values for that pixel. The controller 220 may be configured to output the matrix of pixels 226 (and/or any other suitable parameter value) to any suitable recipient internal or external to the imaging system 200. In one example, the controller 220 may be configured to output the matrix of pixels 226 to another processing component for additional image processing (e.g., filtering, computer vision). In some examples, the processing component may be incorporated into the imaging system 200. In some examples, the processing component may be incorporated into a remote computing device in communication with the imaging system 200. In another example, the controller 220 may be configured to output the matrix of pixels 226 to an external display device for visual presentation as an image. In some implementations, the 2D and 3D image data may be represented using different data structures (e.g., a first matrix for monochrome or color values and a second matrix for depth values).

In some implementations, the imaging system may include separate 2D and 3D cameras having different sensor arrays that are spatially registered to one another to view the same scene, instead of a single sensor array that performs 2D and 3D imaging.

Figure 3:
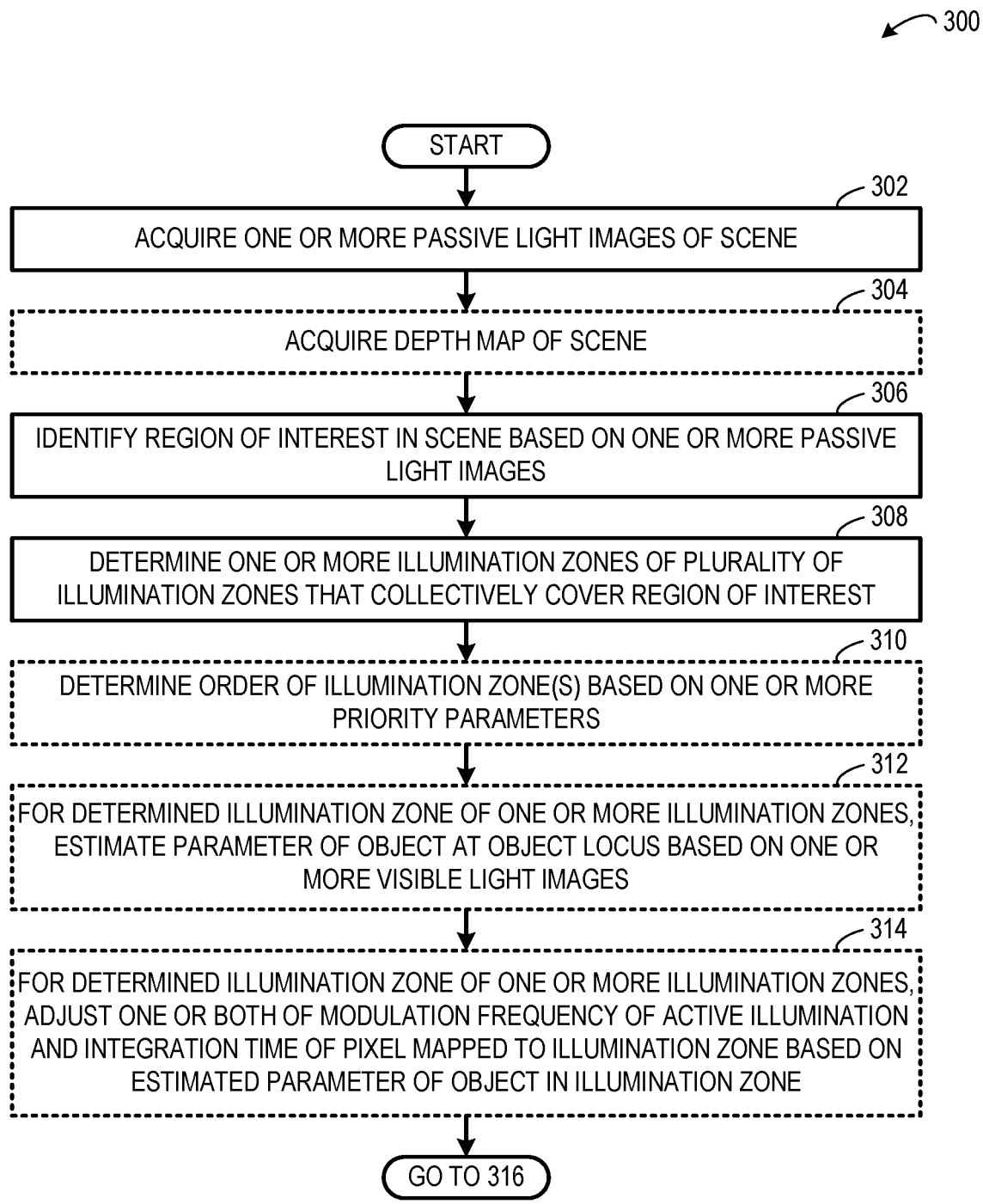
FIGS. 3 and 4 show an example imaging method.
Figure 4:
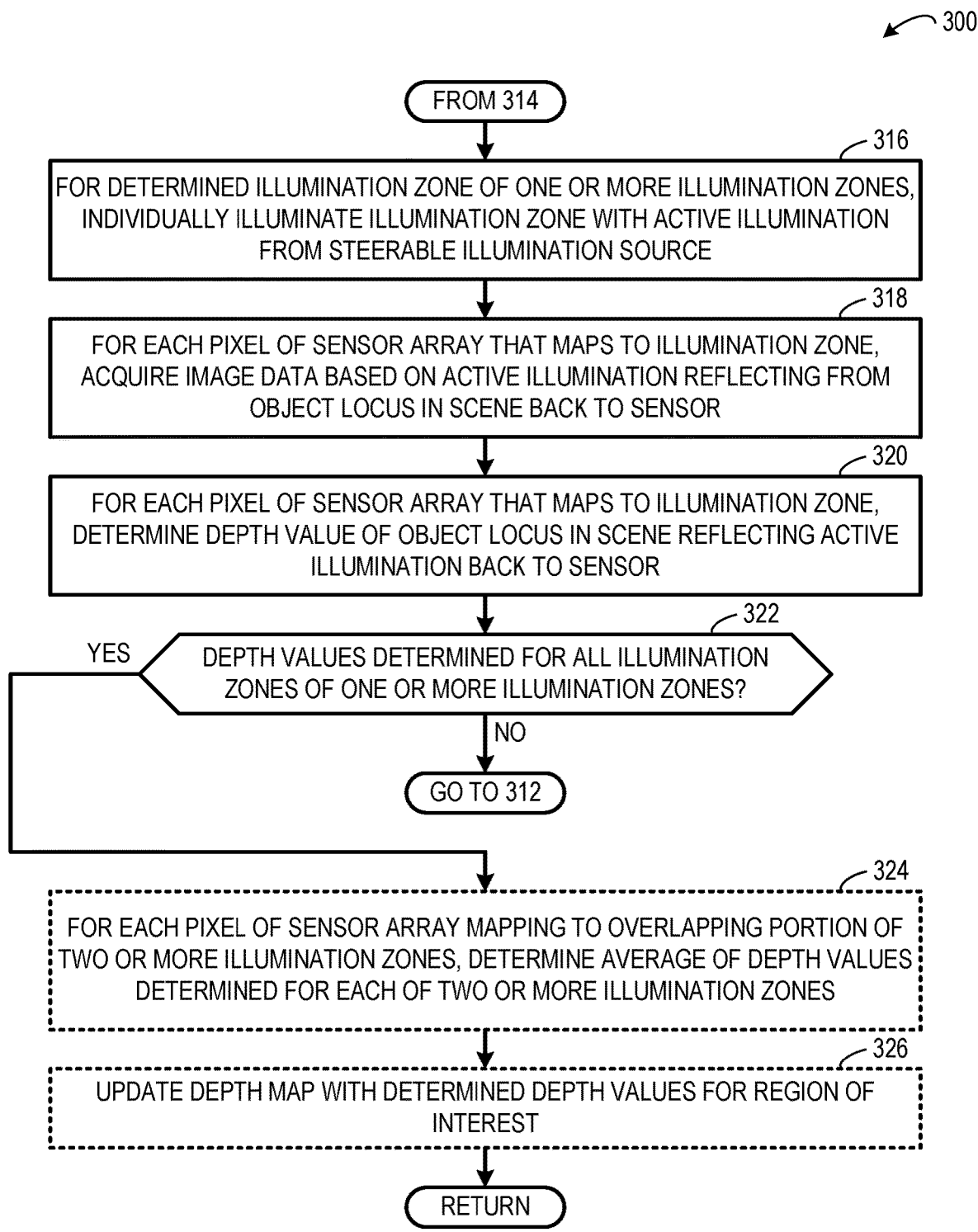

FIGS. 3 and 4 show an example imaging method 300. The imaging method 300 may be performed to acquire 2D and 3D imagery in a manner that is power efficient by providing programmable, on-demand zoned 3D imaging. For example, the imaging method 300 may be performed by the imaging system 200 shown in FIGS. 2A-2C, or generally any suitable imaging system capable of performing 2D and zoned 3D imaging. In FIG. 3, at 302, one or more passive light images of a scene are acquired while a steerable illumination source is deactivated. The one or more passive light images may be full-field 2D images of the scene that are based on ambient light in the scene. The steerable illumination source may be deactivated during 2D image acquisition to increase power efficiency of the imaging system. In some examples, the acquired 2D image(s) may be stored in local on-board memory of the imaging system. In other examples, the acquired 2D image(s) may be stored in memory of a remote computing system in communication with the image system, such as a cloud computing system.

Figure 5:
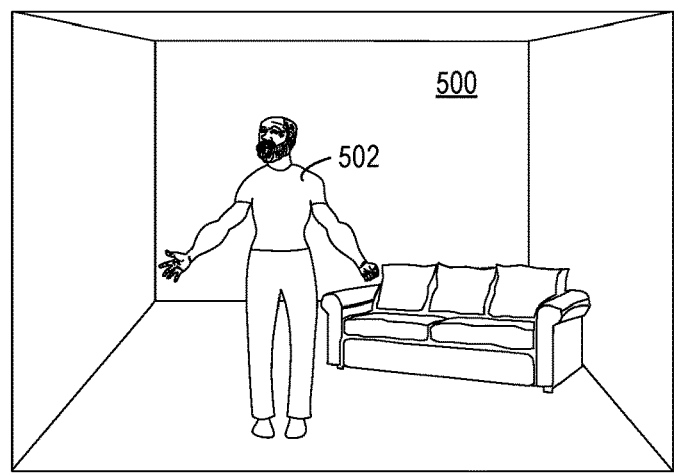
FIGS. 5-7 show example illumination zones determined for a region of interest in a scene.

FIG. 5 shows an example 2D image of a scene 500 that may be acquired by an imaging system. The scene 500 includes a person 502 standing in the middle of a room. The 2D image 500 may be a full-field image acquired based on measurements by all pixels of the sensor array of the imaging system. One or more 2D images of the scene 500 may be acquired in order to identify a region of interest in the scene 500.

Returning to FIG. 3, in some implementations, at 304, a full-field 3D image of the scene optionally may be acquired based on active illumination emitted from the steerable illumination source. The full-field 3D image (or depth map) may include for each pixel of the sensor array of the imaging system that views the scene, a depth value of an object locus in the scene reflecting active illumination back to the pixel. The full-field 3D image may be acquired by sequentially individually illuminating and imaging a plurality of illumination zones that may collectively cover the field of view of the sensor array of the imaging system. Note that each illumination zone may be imaged multiple times (e.g., 3-9) to determine depth values of object loci in the illumination zone for the 3D image.

In some implementations, the full-field 2D image(s) and the full-field 3D image(s) may be acquired by the same senor array of the imaging system in a time multiplexed manner. In other implementations, the full-field 2D image(s) and the full-field 3D image(s) may be acquired by separate cameras of the imaging system that are spatially registered to each other.

In some examples, the acquired 3D image(s) may be stored in local on-board memory of the imaging system. In other examples, the acquired 3D image(s) may be stored in memory of a remote computing system in communication with the image system, such as a cloud computing system.

At 306, a region of interest in the scene is identified based on the one or more passive light images and optionally the full-field 3D image. The region of interest may be any suitable size that is less than the entire field of view of the scene as viewed by the senor array of the imaging system. In some examples, the region of interest may be identified based on recognizing differences between passive light images of the scene acquired at different times. As one such example, the region of interest may be identified by comparing two passive light images acquired sequentially for any pixel-wise changes and changes greater than a threshold may be deemed to be included in the region of interest. In some examples, the imaging system may be configured to track a position of an object in the scene based on passive light images of the scene acquired at different times, and the region of interest may be identified based on a change in the position of the tracked object. In some examples, a foreground-background segmentation algorithm may be employed to identify an object and/or a region of interest. In some examples, one or more previously-trained machine learning classifiers may identify an object of interest (e.g., a human face), and the region of interest may be set as the region of the image that includes the identified object of interest. In some examples when both 2D and 3D acquisitions are on a moving platform, such as a head mounted display, the region of interest may be determined by also taking into account the motion of the camera(s) of the moving platform.

An identified region of interest may take any suitable form. As one example, a region of interest may include a minimum-size bounding box that encapsulates all pixels in the region of interest. As another example, a shape of the region of interest may be based on a shape of the active illumination emitted from the steerable illumination source.

In some examples, if a region of interest is not identified in an acquired passive light image, then the imaging system may continue to acquire additional passive light images without acquiring a 3D image until a region of interest is identified in an acquired passive light image. In this way, the steerable illumination source may remain deactivated until needed for 3D imaging, and power efficiency of the imaging system may be increased relative to an approach where full-field 3D imaging is performed on a regular basis even when a region of interest has not been identified.

Figure 6:
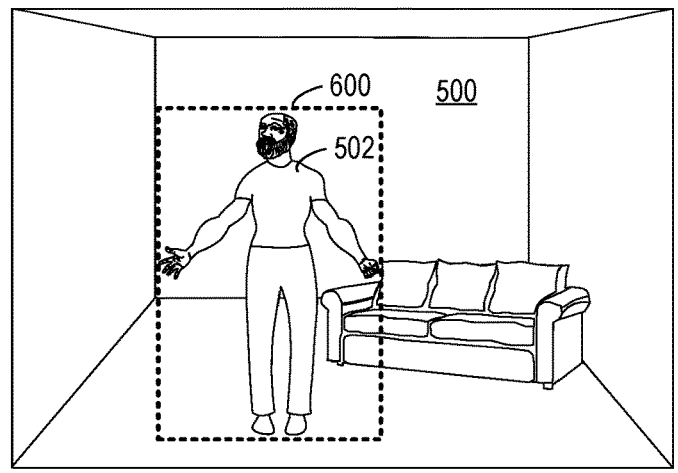

FIG. 6 shows an example region of interest 600 identified in the scene 500 based on the acquired 2D image(s). The region of interest 600 is a bounding box that is sized to contain an entirety of the person 502. As one example, the region of interest 600 may be identified by applying a machine learning image recognition algorithm to the 2D image(s) (e.g., a foreground-background classifier or a body part recognizer).

Returning to FIG. 3, at 308, one or more illumination zones that collectively cover or map to the region of interest are determined. In some examples, the one or more illumination zones may be selected from a plurality of illumination zones that collectively cover or map to a field of view of the sensor array of the imaging system. In some examples, the one or more illumination zones may be selected to minimize a total number of illumination zones needed to cover the region of interest. In this way, the total duration that the steerable illumination source is activated to individually illuminate the number of illumination zones may be reduced in order to increase power efficiency of the imaging system.

Figure 7:
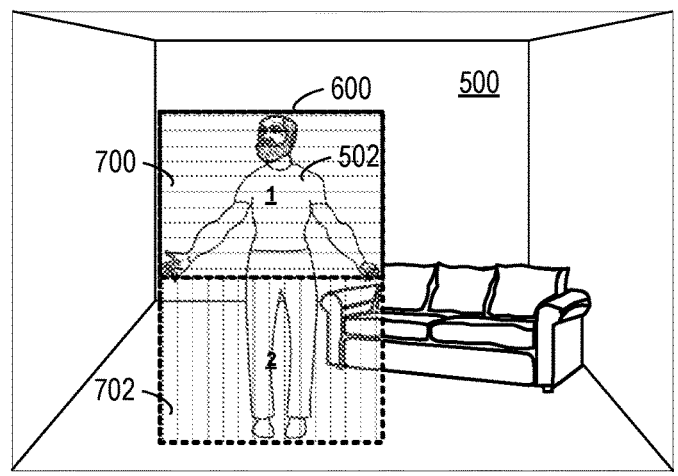

FIG. 7 shows first and second illumination zones 700 and 702 that collectively cover the region of interest 600. In this example, the first and second illumination zones 700 and 702 do not overlap each other.

Note that in the illustrated example the region of interest is covered by only two illumination zones for purposes of simplicity. In practice, a region of interest may be collectively covered by more than two illumination zones. In some cases, a region of interest may be collectively covered by many illumination zones, which may or may not overlap.

Returning to 310 of FIG. 3, an order in which the one or more illumination zones are imaged optionally may be determined based on one or more priority parameters. In some examples, the illumination zones that are individually actively illuminated may be ordered to reduce (or minimize) an illumination path length of the steerable illumination source. In other words, the priority parameter may include the reduced (or a minimum) illumination path length. By ordering the illumination zones in this manner, the illumination zones may be imaged in a time- and power-efficient manner.

Figure 8:
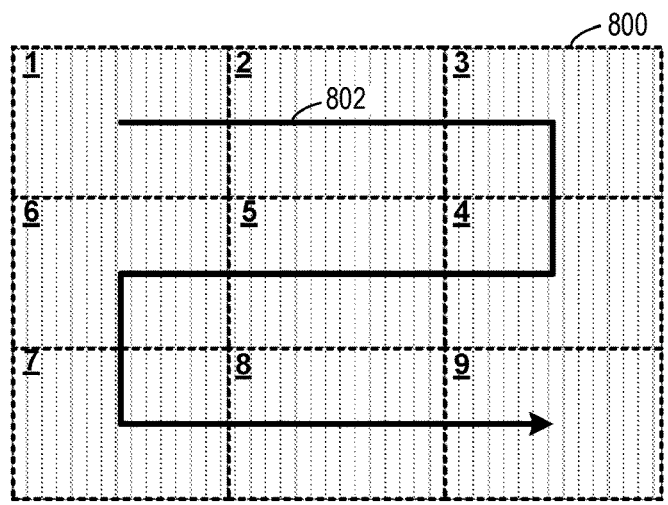
FIGS. 8-10 show different example illumination paths taken by a steerable image source to individually illuminate a plurality of illumination zones.
Figure 9:
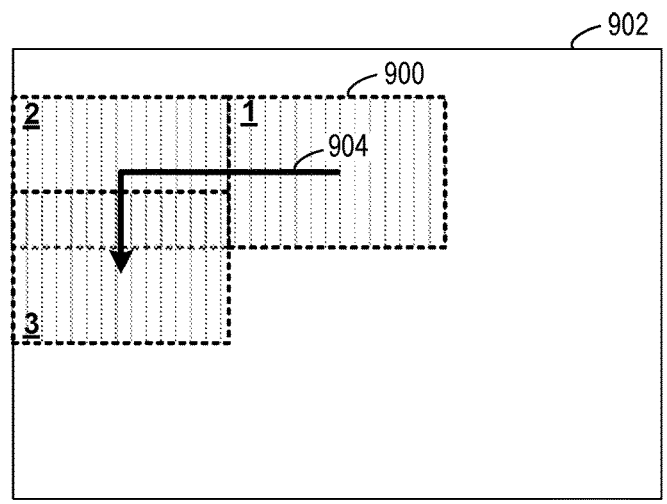
Figure 10:
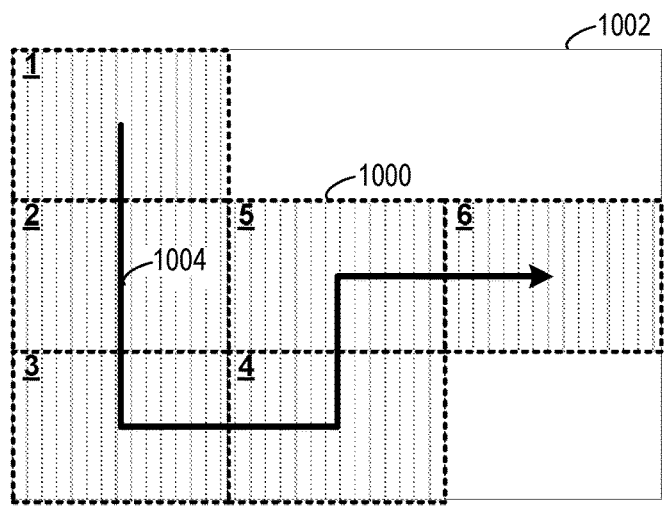

FIGS. 8-10 show different example illumination paths that may be taken by the steerable illumination source to individually illuminate illumination zones in different regions of interest. In FIG. 8, a plurality of illumination zones (e.g., 1-9) that collectively cover an entire field of view of a scene 800 are sequentially individually illuminated for 3D imaging by the steerable illumination source. The steerable illumination source travels along an illumination path 802 to individually illuminate the plurality of illumination zones that cover the scene 800. In particular, the steerable illumination source starts by illuminating illumination zone 1 and incrementally illuminates each illumination zone up to illumination zone 9 following the illumination path 802. The illumination path 802 is preferably selected based on having a reduced (or minimum) length for the steerable illumination source to travel in order to individually illuminate all of the illumination zones.

In FIG. 9, a plurality of illumination zones (e.g., 1-3) that collectively cover a region of interest 900 in a scene 902 are sequentially individually illuminated for 3D imaging by the steerable illumination source. The steerable illumination source travels along an illumination path 904 to individually illuminate the plurality of illumination zones that cover the region of interest 900. In particular, the steerable illumination source starts by illuminating illumination zone 1 and incrementally illuminates each illumination zone up to illumination zone 3 following the illumination path 904. The illumination path 904 is preferably selected based on having a reduced (or minimum) length for the steerable illumination source to travel in order to individually illuminate all of the illumination zones in the region of interest 900.

In FIG. 10, a plurality of illumination zones (e.g., 1-6) that collectively cover a region of interest 1000 in a scene 1002 are sequentially individually illuminated for 3D imaging by the steerable illumination source. The steerable illumination source travels along an illumination path 1004 to individually illuminate the plurality of illumination zones that cover the region of interest 1000. In particular, the steerable illumination source starts by illuminating illumination zone 1 and incrementally illuminates each illumination zone up to illumination zone 6. The illumination path 904 is selected based on having a reduced (or minimum) length for the steerable illumination source to travel in order to individually illuminate all of the illumination zones in the region of interest 1000.

Note that other illumination paths having the same reduced (or minimal) distance may be taken instead of the paths shown in the illustrated examples. In some examples, the illumination path may be based on a starting position of the steerable illumination source, which may vary as the steerable illumination source illuminates different illumination zones in different regions of interest over time throughout operation of the imaging system.

In some implementations, the illumination zones that are individually actively illuminated may be ordered to prioritize one or more illumination zones over other illumination zones of the plurality of illumination zones. For example, if a person is being imaged in the region of interest for gesture recognition, the illumination zones that include the person's hands may be prioritized over other illumination zones in the region of interest. In this example, the person's hands may be imaged first such that gesture recognition algorithms may be executed to analyze the acquired 3D image data while the other illumination zones are being imaged. In this way, gesture recognition may be performed more quickly.

As another example, a first illumination zone may be prioritized over a second illumination zone by imaging the first illumination zone more frequently than the second illumination zone. Using the example of the hands, the illumination zone including the hands may be imaged every frame, whereas other illumination zones in the region of interest but not including the hands may be imaged every other frame. In this way, more accurate and/or up-to-date depth information may be determined for the hands.

Figure 11:
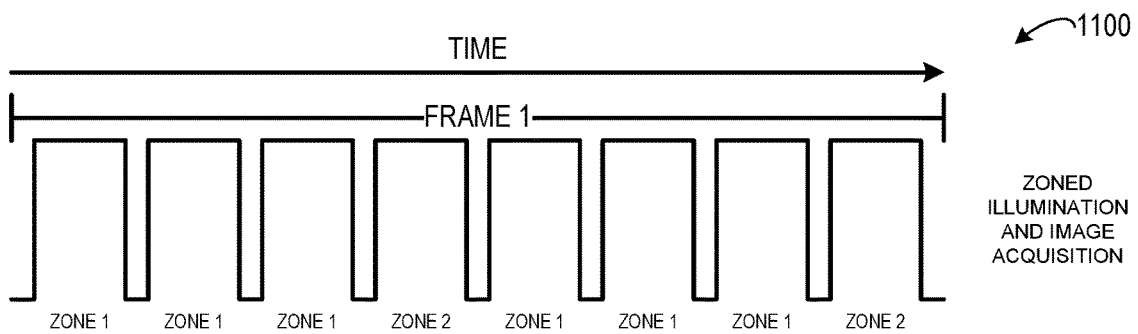
FIGS. 11-13 show different example operating sequences of an imaging system.

FIG. 11 shows an example operating sequence 1100 to acquire images of different illumination zones where a first illumination zone is intra-frame prioritized over a second illumination zone. In the illustrated example, multiple illumination zones are imaged in a single frame. In other examples, a single illumination zone may be imaged per frame, and different illumination zones may be imaged from frame to frame. In particular, during a first three acquisition portions of the frame, the steerable illumination source is activated and steered to emit active illumination light to illuminate the first illumination zone (i.e., ZONE 1), and pixels of the sensor array that are mapped to the first illumination zone are addressed to acquire image data for the first illumination zone. Next, during a fourth acquisition portion of the frame, the steerable illumination source is activated and steered to emit active illumination light to illuminate the second illumination zone (i.e., ZONE 2), and pixels of the sensor array that are mapped to the second illumination zone are addressed to acquire image data for the second illumination zone. Such operation is repeated for the remainder of the frame, such that the first illumination zone is illuminated and imaged for a greater duration than the second illumination zone on an intra-frame basis during the operating sequence 1100.

Figure 12:
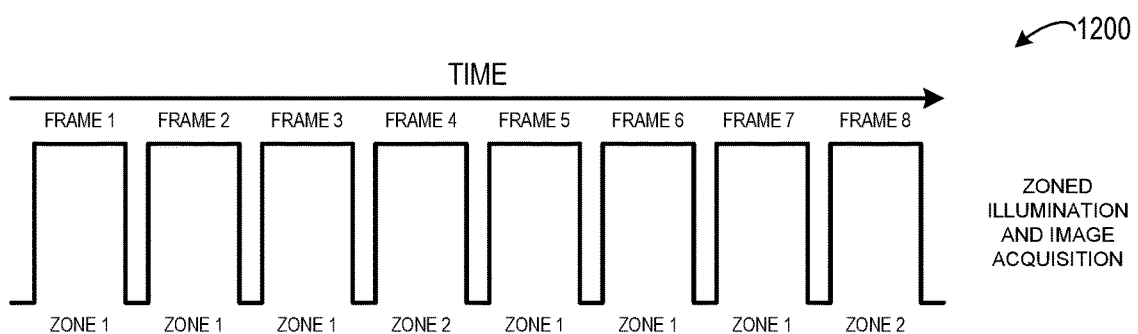

FIG. 12 shows an example operating sequence 1200 to acquire images of different illumination zones where a first illumination zone is prioritized over a second illumination zone on a frame-by-frame basis. In the illustrated example, a single illumination zone is imaged in each frame. In other examples, multiple different illumination zones may be imaged on a per frame basis. In particular, during frames 1-3, the steerable illumination source is activated and steered to emit active illumination light to illuminate the first illumination zone (i.e., ZONE 1), and pixels of the sensor array that are mapped to the first illumination zone are addressed to acquire image data for the first illumination zone. Next, during frame 4, the steerable illumination source is activated and steered to emit active illumination light to illuminate the second illumination zone (i.e., ZONE 2), and pixels of the sensor array that are mapped to the second illumination zone are addressed to acquire image data for the second illumination zone. Such operation is repeated for frames 5-8, such that the first illumination zone is illuminated and imaged for a greater duration than the second illumination zone on a frame-by-frame basis during the operating sequence 1200.

As another example, a first illumination zone may be prioritized over a second illumination zone by skipping imaging of the second illumination zone more frequently than skipping imaging of the first illumination zone.

Figure 13:
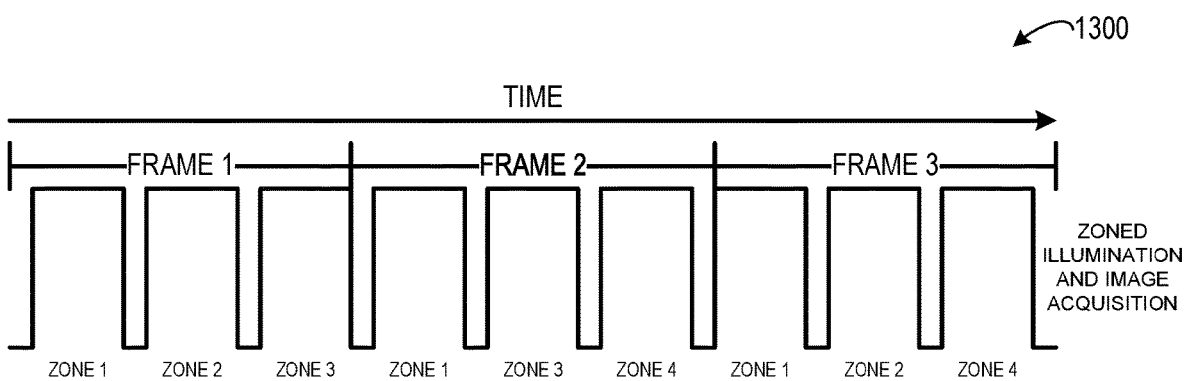

FIG. 13 shows an example operating sequence 1300 to acquire images of different illumination zones where a first illumination zone is prioritized over other illumination zones by skipping imaging of the other illumination zones in different frames. In the illustrated example, multiple illumination zones are imaged in each frame according to a repeating frame sequence. In particular, during a first frame, the steerable illumination source is activated and steered to emit active illumination light to illuminate the first illumination zone (i.e., ZONE 1), and pixels of the sensor array that are mapped to the first illumination zone are addressed to acquire image data for the first illumination zone. Next, during the first frame, the steerable illumination source is activated and steered to emit active illumination light to illuminate a second illumination zone (i.e., ZONE 2), and pixels of the sensor array that are mapped to the second illumination zone are addressed to acquire image data for the second illumination zone. Next, during the first frame, the steerable illumination source is activated and steered to emit active illumination light to illuminate a third illumination zone (i.e., ZONE 3), and pixels of the sensor array that are mapped to the third illumination zone are addressed to acquire image data for the third illumination zone.

During, a second frame, the steerable illumination source is activated and steered to emit active illumination light to illuminate the first illumination zone (i.e., ZONE 1), and pixels of the sensor array that are mapped to the first illumination zone are addressed to acquire image data for the first illumination zone. Next, during the second frame, the steerable illumination source is activated and steered to emit active illumination light to illuminate the third illumination zone (i.e., ZONE 3), and pixels of the sensor array that are mapped to the third illumination zone are addressed to acquire image data for the third illumination zone. Next, during the second frame, the steerable illumination source is activated and steered to emit active illumination light to illuminate a fourth illumination zone (i.e., ZONE 4), and pixels of the sensor array that are mapped to the fourth illumination zone are addressed to acquire image data for the third illumination zone.

During, a third frame, the steerable illumination source is activated and steered to emit active illumination light to illuminate the first illumination zone (i.e., ZONE 1), and pixels of the sensor array that are mapped to the first illumination zone are addressed to acquire image data for the first illumination zone. Next, during the third frame, the steerable illumination source is activated and steered to emit active illumination light to illuminate the second illumination zone (i.e., ZONE 2), and pixels of the sensor array that are mapped to the second illumination zone are addressed to acquire image data for the second illumination zone. Next, during the third frame, the steerable illumination source is activated and steered to emit active illumination light to illuminate a fourth illumination zone (i.e., ZONE 4), and pixels of the sensor array that are mapped to the fourth illumination zone are addressed to acquire image data for the third illumination zone.

According to the operating sequence 1300, the first illumination zone is imaged in each frame. Imaging of the fourth illumination zone is skipped in the first frame of the repeating sequence. Imaging of the second illumination zone is skipped in the second frame of the repeating sequence. Imaging of the third illumination zone is skipped in the third frame of the repeating sequence. Any suitable number of illumination zones may be skipped for any suitable number of frames in an operation sequence. In other implementations, a skipping pattern may be enacted on a frame-by-frame basis.

In some implementations, passive image acquisition may be performed according to a designated time frame. In some examples, a plurality of active zone events (e.g., depth values determined for illumination zones that collectively cover a region of interest) may be generated based on a single passive image frame. However, not all active zone events may be able to be processed before the next passive image frame is to be acquired according to the designated time frame, and unprocessed active zone events may continue to be processed after the next passive image frame is acquired. In some cases, the next passive image frame may indicate that the region of interest has changed (e.g., moved) and one or more of the pending unprocessed active zone events may no longer be necessary in which case those unprocessed active zone events may not be processed.

In some implementations, the steerable illumination source optionally may emit modulated active illumination. A modulation frequency of the modulated active illumination may be adjusted to acquire image data based on the different modulation frequencies. Further, depth values may be determined based on such image data according to a phase-discriminating ToF approach as described above. Since each illumination zone is smaller than the entire field of view of the scene viewed by the senor array, a particular illumination zone may contain objects within a smaller range of distances than the full scene. Furthermore, the particular operating parameters of the imaging system may be adjusted based on one or more parameters of objects (e.g., estimated depth and/or reflectivity) in the illumination zone. Accordingly, a parameter of an object at an object locus in the illumination zone may be estimated based on the one or more passive light images and/or previously acquired depth measurement. Returning to 314 of FIG. 3, one or both of a modulation frequency of active illumination emitted by the steerable illumination source and an integration time of pixels mapped to the illumination zone may be adjusted based on the estimated parameter of the object in the illumination zone. As one example, a range of distances of objects in the illumination zone may be estimated based on the passive light image(s). As another example, reflectivity values of objects in the illumination zone may be estimated based on the passive light image(s). Based on one or both of these two parameters (e.g., range of distances and reflectivity values), a number of frequencies of modulated active illumination and/or an integration time of pixels of the sensor array may be adjusted for the illumination zone to minimize jitter and power consumption during imaging, for example. As one example, for a smaller range of distances of objects in an illumination zone, a higher average frequency and/or fewer frequencies may be used for imaging the illumination zone. As another example, for objects having higher estimated reflectivity values, lower integration times may be used for imaging the illumination zone. In this way, each illumination zone may be imaged with improved frequency and integration time settings.

Turning to FIG. 4, at 316, for a determined illumination zone of the one or more illumination zones, the illumination zone is individually illuminated with active illumination from the steerable illumination source. At, 318, for each pixel of the sensor array that maps to the illumination zone, image data is acquired based on active illumination reflecting from an object locus in the scene back to the pixel. Note that pixels that do not map to the illumination zone need not be addressed during image acquisition. Further, note that the illumination zone may be imaged multiple times to acquire image data for different modulation frequencies of the active illumination. At 320, for each pixel of the sensor array that maps to the illumination zone, a depth value of an object locus in the scene is determined based on the image data. At 322, if depth values have been determined for all illumination zones covering the region of interest, then the method 300 moves to 324. Otherwise, the method 300 moves to 312 for a next illumination zone of the one or more illumination zones that cover the region of interest.

In some implementations where passive images are acquired on a regular basis (e.g., according to a designated time frame), there may be scenarios where depth values are not determined for all illumination zones covering a region of interest within the time frame before a next passive image is to be acquired. As such, even if depth values for all illumination zones covering the region of interest have not been determined, another passive light image may be acquired before the remainder of illumination zones are actively imaged to determine the depth values.

In one example, a passive image is acquired according to a time frame of every 30 ms. A region of interest is identified from a first passive image taken at time t=0. The region of interest is collectively covered by 10 illumination zones that each take 5 ms to process, and thus processing the 10 illumination zones takes a total of 10*5 ms=50 ms. The total processing time is too long to fit within the 30 ms time frame before the next scheduled passive image is acquired. As such, unprocessed illumination zones spill over into the next time frame and are processed after a second passive image is acquired at time t=30 ms. Also, in some cases, unprocessed illumination zones may be pruned out based on analysis of the second passive image.

In some examples, the region of interest may be covered by a plurality of illumination zones such that two or more of the plurality of illumination zones overlap. As shown at 324, for each pixel of the sensor array mapping to an overlapping portion of two or more illumination zones, depth values determined for each of two or more illumination zones optionally may be averaged. Due to the flexibility in choosing the positions of the illumination zones, two or more illumination zones may be determined such that the two or more illumination zones overlap in areas where a higher SNR may be desirable.

Figure 14:
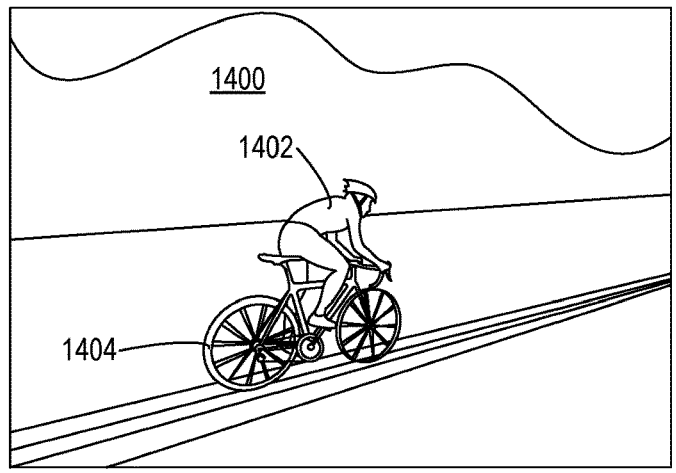
FIGS. 14-16 show example overlapping illumination zones determined for a region of interest in a scene.
Figure 15:
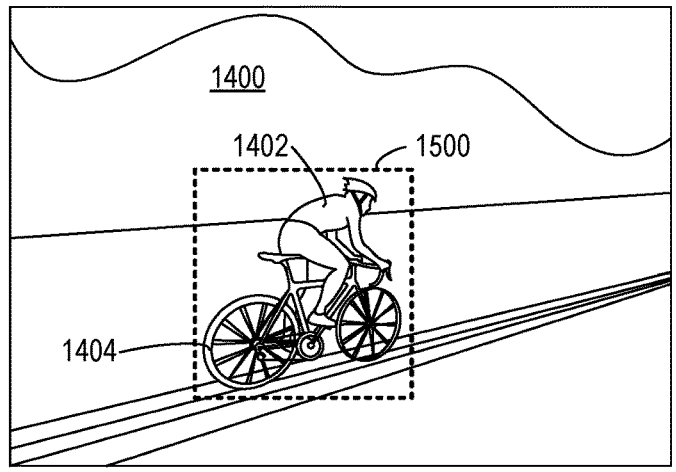
Figure 16:
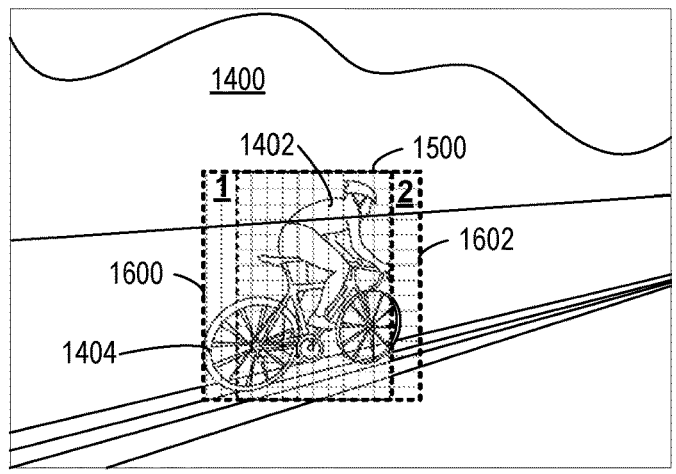

FIGS. 14-16 show an example scenario where two illumination zones overlap in an identified region of interest. FIG. 14 shows an example 2D image of a scene 1400 that may be acquired by the imaging system. The scene 1400 includes a person 1402 riding a bicycle 1404. In FIG. 15, a region of interest 1500 is identified in the scene 1400 based on the 2D image. The region of interest 1500 contains the person 1402 and the bicycle 1404. In this example, the region of interest 1500 is larger than a single illumination zone. Accordingly, as shown in FIG. 16, a first illumination zone 1600 and a second illumination zone 1602 are determined for the region of interest 1500. The first and second illumination zones 1600, 1602 collectively cover the region of interest 1500. The first and second illumination zones 1600, 1602 are determined such that overlapping portions of the illumination zones are positioned on the person 1402 where higher SNR may be desired. As one example, the higher SNR portion may facilitate improved facial recognition accuracy.

Illumination zones may be positioned to at least partially overlap each other in any suitable manner to cover any suitable object in a scene. Any suitable number of illumination zones may be positioned to at least partially overlap each other (e.g., three illumination zones each imaging the same object locus in the scene).

As shown at 326 of FIG. 4 depth values for the region of interest optionally may be updated. Note that depth values in the portion(s) of the depth map outside of the region of interest need not be updated. In some examples, the depth values for the region of interest may be updated in a previously-acquired depth map stored in local memory. In other examples, the depth values for the region of interest may be updated in a previously-acquired depth map stored in memory of a remote computing system in communication with the image system, such as a cloud computing system. In either case, previously-acquired depth values or no depth values may be used for other portions of the image until such other portions are depth-imaged.

Figure 17:
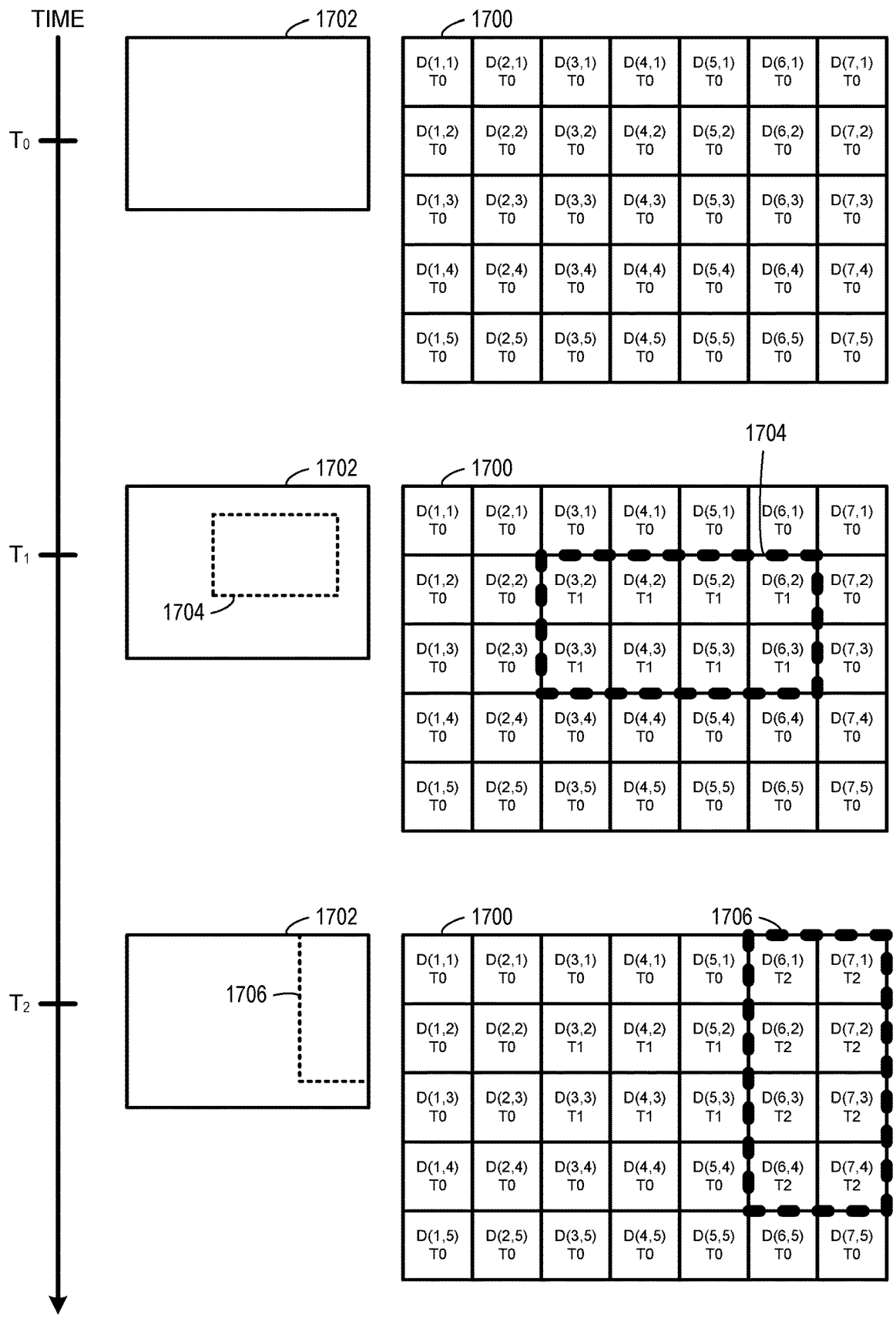
FIG. 17 shows an example depth map including depth values that are updated based on imaging different regions of interest in a scene.

FIG. 17 shows an example depth map 1700 of a scene 1702 including depth values that are updated as different regions of interest are imaged over a duration from time $T_0$ to $T_2$. At time $T_0$, the depth map 1700 of the scene 1702 is determined based on images of a plurality of illumination zones that collectively cover the scene 1702. The depth map 1700 includes a plurality of pixels (labeled by column and row e.g., (1,1)-(7,5)) having depth values (D) that are determined in the $T_0$ timeframe. While FIG. 17 uses the variable "D" as a placeholder, it is to be understood that a distance value, phase offset value, or other value useable to calculate the depth of an object locus imaged by the corresponding pixel may be determined and saved (e.g., D(1,1) T0 may equal 238 cm). At time $T_1$, updated depth values are determined for a region of interest 1704 in the scene 1702 based on images of one or more illumination zones that collectively cover the region of interest 1704. In particular, pixels (3,2), (4,2), (5,2), (6,2), (3,3), (4,3), (5,3), and (6,3) of the depth map 1700 that map to the region of interest 1704 have updated depth values (D) that are determined in the $T_1$ timeframe. The depth values of other pixels of the depth map 1700 that are outside the region of interest 1704 are not updated at time $T_1$. At time $T_2$, updated depth values are determined for another region of interest 1706 in the scene 1702 based on images of one or more illumination zones that collectively cover the region of interest 1706. In particular, pixels (6,1), (7,1), (6,2), (7,2), (6,3), (7,3), (6,3), and (7,3) of the depth map 1700 that map to the region of interest 1706 have updated depth values (D) that are determined in the $T_2$ timeframe. The depth values of other pixels of the depth map 1700 that are outside the region of interest 1704 are not updated at time $T_2$. According to such an approach, the depth map can be updated to reflect changes of depth in the scene on demand without having to update all depth values of the depth map for each change. As such, the depth map may be updated in a time- and power-efficient manner.

The above described imaging method may provide continuous 2D imaging and programmable, on-demand 3D imaging for identified regions of interest. Such an imaging method may increase power efficiency of an imaging system relative to an approach where 3D imaging is performed continuously.

In some implementations, the methods and processes described herein may be tied to a computing system of one or more computing devices. In particular, such methods and processes may be implemented as a computer-application program or service, an application-programming interface (API), a library, and/or other computer-program product.

Figure 18:
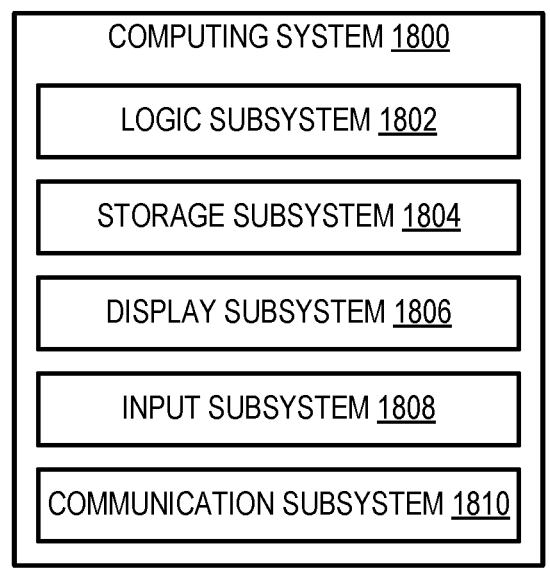
FIG. 18 shows an example computing system.

FIG. 18 schematically shows a simplified representation of a computing system 1800 configured to provide any to all of the compute functionality described herein. Computing system 1800 may take the form of one or more cameras, such as a 2D/3D/depth (e.g., ToF) camera, personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. As examples, the computing system 1800 may take the form of the devices and/or imaging systems 100A/102A, 100B/102B, 100C/102C, 100D/102D shown in FIG. 1 and the imaging system 200 shown in FIG. 2.

Computing system 1800 includes a logic subsystem 1802 and a storage subsystem 1804. Computing system 1800 may optionally include a display subsystem 1806, input subsystem 1808, communication subsystem 1810, and/or other subsystems not shown in FIG. 18.

Logic subsystem 1802 includes one or more physical devices configured to execute instructions. For example, the logic subsystem 1802 may be configured to execute instructions that are part of one or more applications, services, or other logical constructs. The logic subsystem 1802 may include one or more hardware processors configured to execute software instructions. Additionally or alternatively, the logic subsystem 1802 may include one or more hardware or firmware devices configured to execute hardware or firmware instructions. Processors of the logic subsystem 1802 may be single-core or multi-core, and the instructions executed thereon may be configured for sequential, parallel, and/or distributed processing. Individual components of the logic subsystem 1802 optionally may be distributed among two or more separate devices, which may be remotely located and/or configured for coordinated processing. Aspects of the logic subsystem 1802 may be virtualized and executed by remotely accessible, networked computing devices configured in a cloud-computing configuration.

Storage subsystem 1804 includes one or more physical devices configured to temporarily and/or permanently hold computer information such as data and instructions executable by the logic subsystem 1802. When the storage subsystem 1804 includes two or more devices, the devices may be collocated and/or remotely located. Storage subsystem 1804 may include volatile, nonvolatile, dynamic, static, read/write, read-only, random-access, sequential-access, location-addressable, file-addressable, and/or content-addressable devices. Storage subsystem 1804 may include removable and/or built-in devices. When the logic subsystem 1802 executes instructions, the state of storage subsystem 1804 may be transformed—e.g., to hold different data.

Aspects of logic subsystem 1802 and storage subsystem 1804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example. For example, the logic subsystem and the storage subsystem may be included in the controller 220 shown in FIG. 2.

The logic subsystem 1802 and the storage subsystem 1804 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or supersegmental models (e.g., hidden dynamic models)).

In an example, an imaging system comprises a sensor array including a plurality of pixels, a steerable illumination source configured to individually actively illuminate different illumination zones of a plurality of illumination zones in a scene viewed by the sensor array, and a controller configured to acquire one or more passive light images of the scene with the sensor array while the steerable illumination source is deactivated, identify a region of interest in the scene based on the one or more passive light images, determine one or more illumination zones of the plurality of illumination zones that collectively cover the region of interest, for a determined illumination zone of the one or more illumination zones, individually illuminate the illumination zone with active illumination from the steerable illumination source, and for a pixel of the sensor array that maps to the illumination zone, determine a depth value of an object locus in the scene reflecting the active illumination back to the pixel. In this example and/or other examples, the region of interest may be collectively covered by a plurality of illumination zones. In this example and/or other examples, two or more illumination zones of the plurality of illumination zones may at least partially overlap, and the controller may be configured to, for a pixel of the sensor array mapping to an overlapping portion of the two or more illumination zones, determine an average of the depth values determined for each of the two or more illumination zones. In this example and/or other examples, the steerable illumination source may be configured to emit modulated active illumination, and the controller may be configured to adjust a modulation frequency of the modulated active illumination. In this example and/or other examples, the controller may be configured to estimate a parameter of an object at the object locus based on the one or more passive light images, and adjust a modulation frequency of the active illumination based on the estimated parameter of the object in the illumination zone. In this example and/or other examples, the controller may be configured to estimate a parameter of an object at the object locus based on the one or more passive light images, and adjust an integration time of the pixel mapped to the illumination zone based on the estimated parameter of the object in the illumination zone. In this example and/or other examples, the controller may be configured to order the illumination zones that are individually actively illuminated to reduce an illumination path length of the steerable illumination source. In this example and/or other examples, the controller may be configured to prioritize a first illumination zone of the plurality of illumination zones over a second illumination zone of the plurality of illumination zones. In this example and/or other examples, the steerable illumination source may individually actively illuminate the first illumination zone more frequently than the steerable illumination source individually actively illuminates the second illumination zone. In this example and/or other examples, the depth value may update a previously determined depth value in a depth map, the previously determined depth value may be determined for the pixel of the sensor array that maps to the illumination zone, and the depth map may retain a previously determined depth value for a different pixel of the sensor array that does not map to any of the one or more illumination zones that collectively cover the region of interest. In this example and/or other examples, the region of interest may be identified based on recognizing differences between passive light images of the scene acquired at different times. In this example and/or other examples, the controller may be configured to track a position of an object in the scene based on passive light images of the scene acquired at different times, and the controller may be configured to identify the region of interest based on a change in the position of the object.

In an example, an imaging method comprises acquiring one or more passive light images of a scene, identifying a region of interest in the scene based on the one or more passive light images, determining one or more illumination zones of a plurality of illumination zones that collectively cover the region of interest, each illumination zone sized according to active illumination emitted from a steerable illumination source, for a determined illumination zone of the one or more illumination zones, individually illuminating the illumination zone with the active illumination from the steerable illumination source, and for a pixel of a sensor array that maps to the illumination zone, determining a depth value of an object locus in the scene reflecting the active illumination back to the pixel. In this example and/or other examples, the one or more passive light images and the one or more depth values may be determined based on measurements performed by a same senor array. In this example and/or other examples, the region of interest may be collectively covered by a plurality of illumination zones. In this example and/or other examples, two or more illumination zones of the plurality of illumination zones may at least partially overlap, and the method may further comprise for a pixel of the sensor array mapping to an overlapping portion of the two or more illumination zones, determining an average of the depth values determined for each of the two or more illumination zones. In this example and/or other examples, a first illumination zone of the plurality of illumination zones may be prioritized over a second illumination zone of the plurality of illumination zones. In this example and/or other examples, the steerable illumination source may individually actively illuminate the first illumination zone more frequently than the steerable illumination source individually actively illuminates the second illumination zone. In this example and/or other examples, the method may further comprise estimating a parameter of an object at the object locus based on the one or more passive light images, and adjusting one or both of a modulation frequency of the active illumination and an integration time of the pixel mapped to the illumination zone based on the estimated parameter of the object in the illumination zone.

In an example, an imaging method comprises acquiring one or more passive light images of a scene, identifying a region of interest in the scene based on the one or more passive light images, determining a plurality of illumination zones that collectively cover the region of interest, each illumination zone sized according to active illumination emitted from a steerable illumination source, determining an order in which the illumination zones are imaged based on one or more priority parameters, for each of the plurality of illumination zones in the determined order, individually illuminating the illumination zone with the active illumination from the steerable illumination source, and for each pixel of a sensor array that maps to the illumination zone, determining a depth value of an object locus in the scene reflecting the active illumination back to the pixel.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An imaging system comprising:
a sensor array including a plurality of pixels collectively having a field of view of a scene;
a steerable illumination source configured to individually actively illuminate different illumination zones of a plurality of illumination zones with active illumination light having a smaller angular extent than the field of view of the sensor array; and
a controller configured to:
  acquire one or more passive light images of the scene with the sensor array while the steerable illumination source is deactivated,
  identify a region of interest in the scene based on the one or more passive light images,
  determine one or more illumination zones of the plurality of illumination zones that collectively cover the region of interest,
  determine a dark zone that does not at least partially cover the region of interest,
  for each of the determined illumination zones of the one or more illumination zones that collectively cover the region of interest, individually illuminate the determined illumination zone with the active illumination light from the steerable illumination source without actively illuminating the dark zone that does not at least partially cover the region of interest, and
  for a pixel of the sensor array that maps to the illumination zone, determine a depth value of an object locus in the scene reflecting the active illumination light back to the pixel.

2. The imaging system of claim 1, wherein the region of interest is collectively covered by a plurality of illumination zones.

3. The imaging system of claim 2, wherein two or more illumination zones of the plurality of illumination zones at least partially overlap, and wherein the controller is configured to, for a pixel of the sensor array mapping to an overlapping portion of the two or more illumination zones, determine an average of the depth values determined for each of the two or more illumination zones.

4. The imaging system of claim 2, wherein the steerable illumination source is configured to emit modulated active illumination light, and wherein the controller is configured to adjust a modulation frequency of the modulated active illumination light.

5. The imaging system of claim 4, wherein the controller is configured to estimate a parameter of an object at the object locus based on the one or more passive light images, and adjust a modulation frequency of the active illumination light based on the estimated parameter of the object in the illumination zone.

6. The imaging system of claim 4, wherein the controller is configured to estimate a parameter of an object at the object locus based on the one or more passive light images, and adjust an integration time of the pixel mapped to the illumination zone based on the estimated parameter of the object in the illumination zone.

7. The imaging system of claim 2, wherein the controller is configured to order the illumination zones that are individually actively illuminated to reduce an illumination path length of the steerable illumination source.

8. The imaging system of claim 2, wherein the controller is configured to prioritize a first illumination zone of the plurality of illumination zones over a second illumination zone of the plurality of illumination zones.

9. The imaging system of claim 7, wherein the steerable illumination source individually actively illuminates the first illumination zone more frequently than the steerable illumination source individually actively illuminates the second illumination zone.

10. The imaging system of claim 1, wherein the depth value updates a previously determined depth value in a depth map, the previously determined depth value determined for the pixel of the sensor array that maps to the illumination zone, and wherein the depth map retains a previously determined depth value for a different pixel of the sensor array that does not map to any of the one or more illumination zones that collectively cover the region of interest.

11. The imaging system of claim 1, wherein the region of interest is identified based on recognizing differences between passive light images of the scene acquired at different times.

12. The imaging system of claim 1, wherein the controller is configured to track a position of an object in the scene based on passive light images of the scene acquired at different times, and wherein the controller is configured to identify the region of interest based on a change in the position of the object.

13. An imaging method, comprising:
acquiring one or more passive light images of a scene;
identifying a region of interest in the scene based on the one or more passive light images;
determining one or more illumination zones of a plurality of illumination zones that collectively cover the region of interest, each illumination zone sized according to active illumination light emitted from a steerable illumination source, the active illumination light having a smaller angular extent than a field of view of a sensor array;
determine a dark zone that does not at least partially cover the region of interest,
for each of the determined illumination zones of the one or more illumination zones, individually illuminating the determined illumination zone with the active illumination light from the steerable illumination source without actively illuminating the dark zone that does not at least partially cover the region of interest; and for a pixel of the sensor array that maps to the illumination zone, determining a depth value of an object locus in the scene reflecting the active illumination light back to the pixel.

14. The method of claim 13, wherein the one or more passive light images and the one or more depth values are determined based on measurements performed by a same senor array.

15. The method of claim 13, wherein the region of interest is collectively covered by a plurality of illumination zones.

16. The method of claim 15, wherein two or more illumination zones of the plurality of illumination zones at least partially overlap, and wherein the method further comprises for a pixel of the sensor array mapping to an overlapping portion of the two or more illumination zones, determining an average of the depth values determined for each of the two or more illumination zones.

17. The method of claim 15, wherein a first illumination zone of the plurality of illumination zones is prioritized over a second illumination zone of the plurality of illumination zones.

18. The method of claim 17, wherein the steerable illumination source individually actively illuminates the first illumination zone more frequently than the steerable illumination source individually actively illuminates the second illumination zone.

19. The method of claim 15, further comprising:
estimating a parameter of an object at the object locus based on the one or more passive light images; and adjusting one or both of a modulation frequency of the active illumination light and an integration time of the pixel mapped to the illumination zone based on the estimated parameter of the object in the illumination zone.

20. An imaging method, comprising:

acquiring one or more passive light images of a scene;

identifying a region of interest in the scene based on the one or more passive light images;

determining a plurality of illumination zones that collectively cover the region of interest, each determined illumination zone sized according to active illumination light emitted from a steerable illumination source, the active illumination light having a smaller angular extent than a field of view of a sensor array;

determining an order in which the determined illumination zones are imaged based on one or more priority parameters;

determining a dark zone that does not at least partially cover the region of interest, for each of the plurality of determined illumination zones in the determined order, individually illuminating the determined illumination zone with the active illumination light from the steerable illumination source without actively illuminating the dark zone that does not at least partially cover the region of interest; and for each pixel of the sensor array that maps to the illumination zone, determining a depth value of an object locus in the scene reflecting the active illumination light back to the pixel.

* * * * *